United States Patent [19]

Lindemood

[11] Patent Number: 4,671,008
[45] Date of Patent: Jun. 9, 1987

[54] FISHING TACKLE BOX

[76] Inventor: Norman R. Lindemood, 8351 E. Wadora Cir., North Canton, Ohio 44720

[21] Appl. No.: 849,701

[22] Filed: Apr. 9, 1986

[51] Int. Cl.⁴ ............................................. A01K 97/04
[52] U.S. Cl. .......................................... 43/54.1; 43/56
[58] Field of Search .................... 43/54.1, 55, 56, 57.1

[56] References Cited

U.S. PATENT DOCUMENTS

| | | | |
|---|---|---|---|
| 2,438,739 | 3/1948 | Burruss | 43/56 |
| 2,560,054 | 7/1951 | Wells | 43/55 |
| 2,673,454 | 3/1954 | Gallie et al. | 43/56 |
| 3,478,463 | 11/1969 | Ruter | 43/55 |
| 3,603,019 | 9/1971 | Smeltzer | 43/54.1 |
| 3,797,160 | 3/1974 | Lewis | 43/55 |
| 3,919,803 | 11/1975 | Manguso | 43/55 |
| 3,988,853 | 11/1976 | Hudkins | 43/55 |
| 4,128,170 | 12/1978 | Elliott | 43/54.1 |
| 4,168,590 | 9/1979 | Beshoner | 43/55 |

OTHER PUBLICATIONS

Cabela's 1986 Spring Catalogue, p. 107.
Spivey's 1986 Spring Catalogue, pp. 138–143.

*Primary Examiner*—M. Jordan
*Attorney, Agent, or Firm*—Sand & Hudak Co.

[57] ABSTRACT

A buoyant tackle box molded of plastic has a rectangular outer housing and a plurality of inner storage compartments formed by partition walls. A vertical passageway is formed in the center of the housing by the partition walls and communicates with an opening in the bottom wall of the housing. A fish net is mounted on the housing and extends through the vertical passageway and is suspended beneath the housing as it floats in a body of water for securing the caught fish. A pump is removably mounted in one of the compartments for circulating water within the compartments for sustaining live bait temporarily placed in the compartment. A plurality of storage inserts are removably mounted within the storage compartments. One of the inserts contains a lower compartment for holding a frozen coolant for cooling items storage in an upper compartment of the insert. Another insert slidably receives a plurality of individual storage trays and a third insert has a plurality of vertical storage compartments for retaining individual artificial lures. A lid is pivotally mounted on the outer housing and secures the storage inserts in their individual compartments. The lid has a central opening which aligns with the vertical passageway and bottom opening for placing fish into the suspended net without opening the tackle box.

17 Claims, 28 Drawing Figures

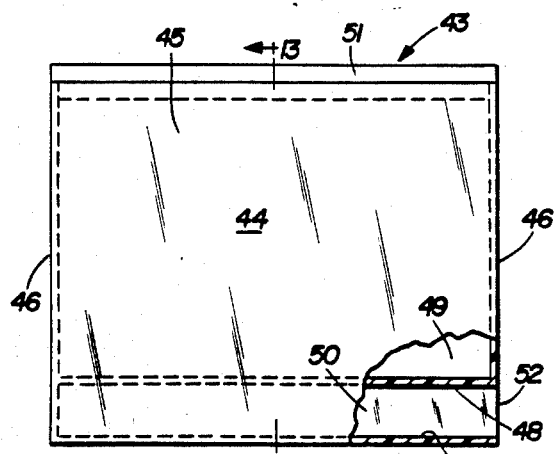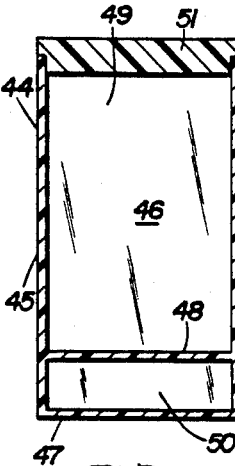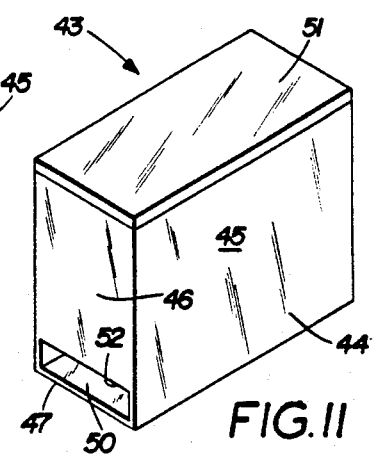
FIG. 12  FIG. 13  FIG. 11
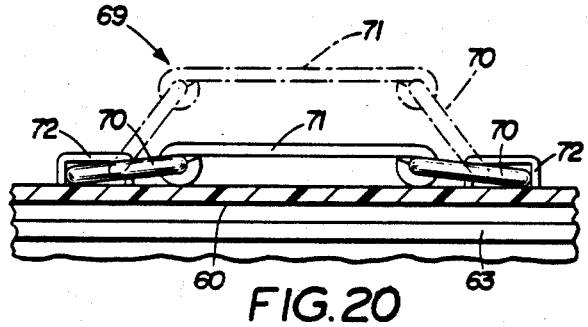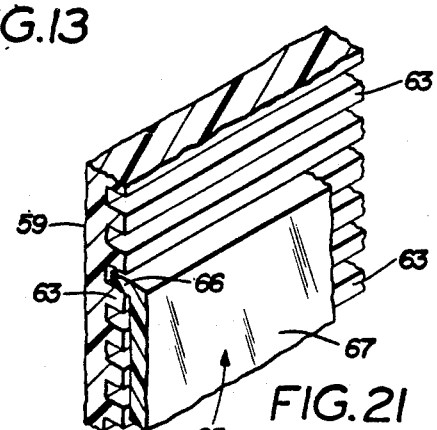
FIG. 20  FIG. 21
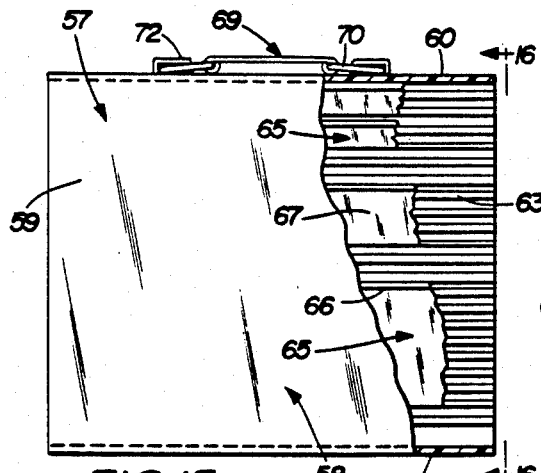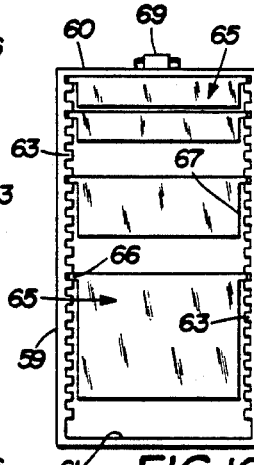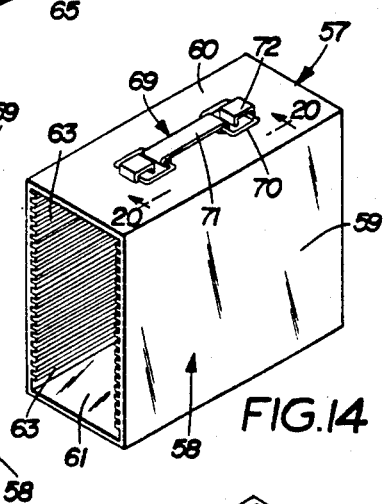
FIG. 15  FIG. 16  FIG. 14
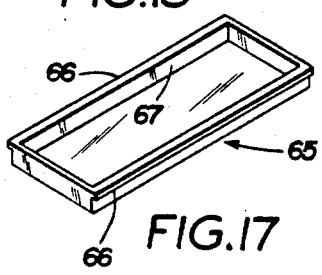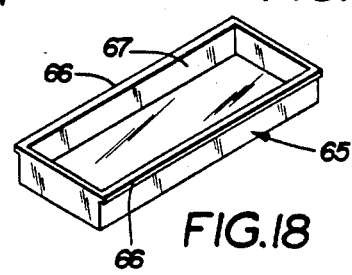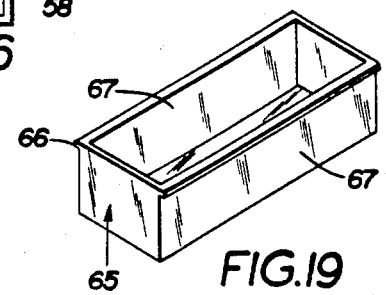
FIG. 17  FIG. 18  FIG. 19

FISHING TACKLE BOX

TECHNICAL FIELD

The invention relates to a storage box containing a number of storage inserts and in particular to an improved buoyant fishing tackle box. More particularly, the invention relates to an improved buoyant tackle box containing a plurality of compartments for receiving versatile inserts which provides storage for most items used by a fisherman and which incorporates a mesh fish container extending beneath the box for retaining captured fish in the water.

BACKGROUND ART

Numerous types, styles, and arrangements of fishing tackle boxes have been developed for storing fishing lures, hooks, and other paraphernalia used by a fisherman. Furthermore, numerous types of containers have been developed for use in storing live bait such as worms, maggots, and other similar bait, as well as containers holding water for storing minnows, crawfish and the like. Many types of fishing is performed while the fisherman is wading in a body of water or is seated in a boat in the water. The fisherman has a constant struggle with his equipment. He has to control many containers or individual items of equipment in pursuit of his sport. Also, boats may be strewn with such equipment to the extent that it is difficult and dangerous to move about. When the fisherman is fishing from the shore of a body of water he is required to make multiple trips to move his equipment from location to location.

Thus the need has existed for an improved tackle box which will enable nearly all of the standard equipment used by a fisherman to be carried conveniently within the tackle box and which includes a provision for securing the catch of the day in conjunction with the fishing tackle box, and in which the box is buoyant and can float adjacent to the fisherman for ready access. There is no known tackle box construction of which I am aware, other than my invention described below, which provides such features.

DISCLOSURE OF THE INVENTION

Objectives of the invention include providing an improved tackle box which is formed of molded plastic, providing a generally watertight container which will float in the body of water adjacent to the fisherman, and which contains a plurality of compartments adapted to receive various inserts for containing the numerous items used by most fisherman. Another objective is to provide such a tackle box in which one of storage inserts has a lower compartment for receiving a frozen coolant and an upper compartment for storing live bait or for storing food and drinks; in which one of the inserts has a plurality of vertical compartments for individually storing artifical lures; and in which another of the inserts containing a plurality of trays for holding various lures, sinkers, hooks, and other fishing equipment.

A further objective of the invention is to provide such an improved tackle box in which one of the compartments is adapted to receive a battery operated pump for circulating water within the compartment to store live minnows, crawfish, or other live bait, when the pump is removed can receive another of the storage inserts therein; and in which a rod and/or landing net holster can be affixed to one or more sidewalls of the tackle box for accepting the butt and reel of a flyrod or other type of rod, net handle, or the like freeing the hands of the fisherman for other uses.

A further objective is to provide such an improved tackle box having a passageway extending through the center of the box to provide access to a mesh fish container secured to the lower periphery of the tackle box for receiving the catch of the day, which container is compressable for compact storage in the tackle box when not in use; and in which a carrier handle for the tackle box prevents escape of the fish from the storage container. Still another objective is to provide such an improved tackle box in which all of the components can be molded of lightweight, rugged plastic to provide a construction which will not rust and is unaffected by salt water or other harsh environments, which provides storage for nearly all items required by a fisherman during the day; which can be adaptable for use by various types of fisherman by merely changing certain of the inserts stored within the box compartments; and which provides a sturdy, durable and highly efficient device.

These objectives and advantages of the invention are obtained by the improved tackle box construction, the general nature of which may be stated as including a buoyant rectangular shaped outer housing having a bottom wall, a pair of spaced parallel side walls and spaced parallel front and rear walls, and an open top; an opening formed in the bottom wall of the housing; a lid for selectively closing the open top of the housing; a plurality of partition walls forming a plurality of storage compartments within said housing and forming a vertical passageway extending between the open top and bottom wall opening; storage inserts removably mounted in certain of the storage compartments for storing a variety of items; and a fish storage net mounted on the housing and and extending beneath the bottom wall of the housing and having an opening aligned with the bottom wall opening for retaining fish placed therein through the open top of the housing and through the vertical passageway.

BRIEF DESCRIPTION OF THE DRAWINGS

A preferred embodiment of the invention, illustrative of the best mode in which applicant has contemplated applying the principles of the invention, is set forth in the following description and is shown in the drawings and is particularly and distinctively pointed out and set forth in the appended claims.

FIG. 11 is a diagrammatic perspective view of the cold storage insert component of the improved tackle box;

FIG. 12 is an enlarged elevational view of the cold storage insert of FIG. 11 with portions broken away and in section;

FIG. 13 is a sectional view taken on line 13—13, FIG. 12;

FIG. 14 is a diagrammatic perspective view similar to FIG. 11 showing the tackle storage insert component of the improved tackle box;

FIG. 15 is an enlarged elevational view with portions broken away and in section, of the tackle storage insert of FIG. 14 with portions of tackle storage trays shown therein;

FIG. 16 is an end elevational view looking in the direction of arrows 16—16, FIG. 15;

FIGS. 17, 18 and 19 are diagrammatic perspective views of three different sized tackle storage trays adapted to be contained in the tackle storage insert shown in FIGS. 14-16;

FIG. 20 is an enlarged fragmentary sectional view taken on line 20—20, FIG. 14;

FIG. 21 is an enlarged fragmentary sectional view showing a portion of a storage tray slidably engaged with the guide rails formed in a sidewall of the tackle storage insert;

Similar numerals refer to similar parts throughout the drawings.

BEST MODE FOR CARRYING OUT THE INVENTION

Figure 2:
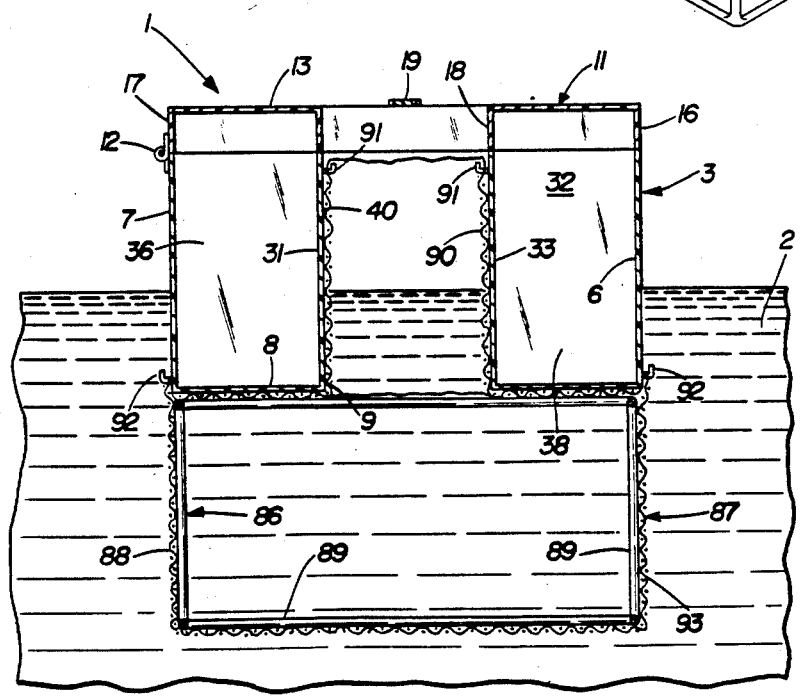
FIG. 2 is a diagrammatic vertical sectional view of the tackle box of FIG. 1 floating in a body of water.
Figure 5:
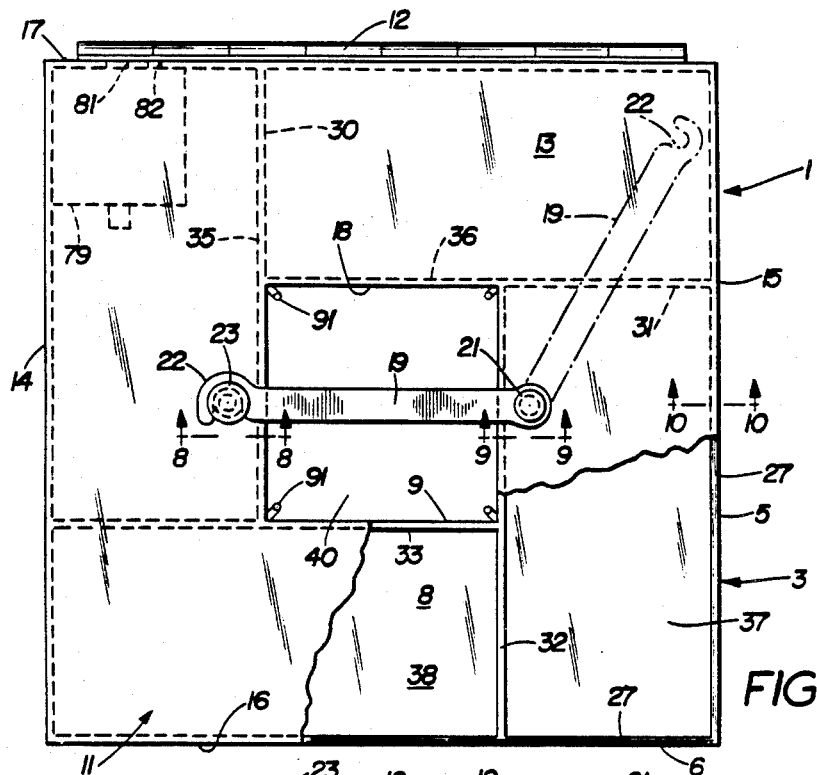
FIG. 5 is an enlarged top plan view of the tackle box of FIG. 1 with portions broken away and with the carrier handle being shown in full line closed position and in dot-dash lines in the open position.
Figure 6:
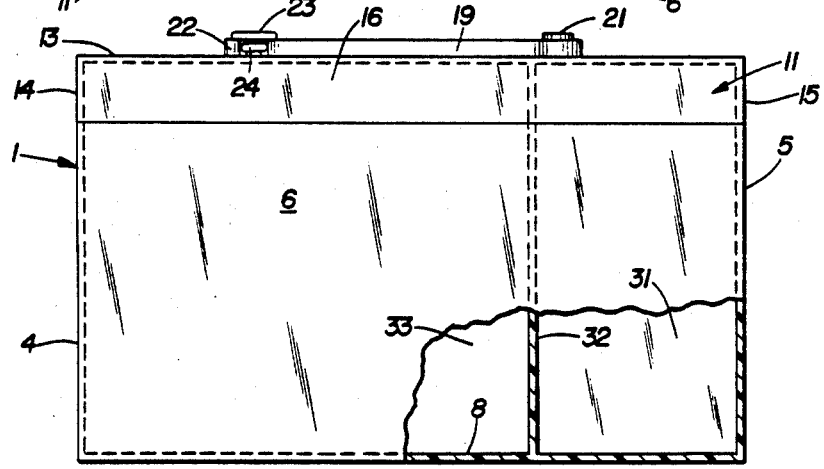
FIG. 6 is a front elevational view of the tackle box shown in FIG. 5, with portions broken away and in section.
Figure 9:
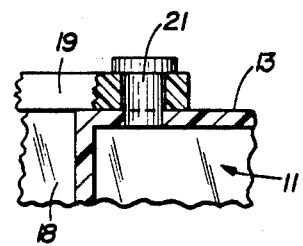
FIG. 9 is an enlarged fragmentary sectional view taken on line 9—9, FIG. 5.
Figure 7:
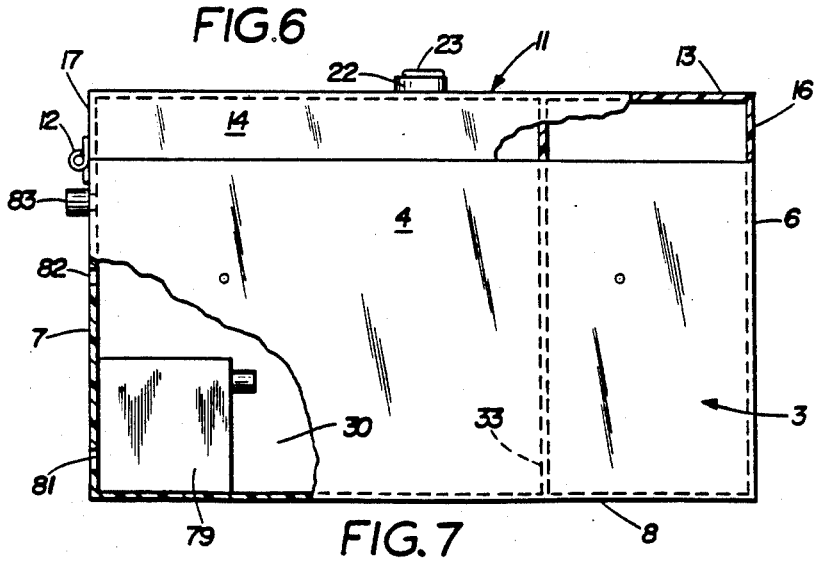
FIG. 7 is a left-hand end elevational view of the tackle box shown in FIG. 5, with portions broken away and in section.

The improved tackle box is indicated generally at 1, and is shown in FIG. 2 floating in a body of water 2. Box 1 includes a rectangular-shaped housing indicated generally at 3, formed by spaced parallel sidewalls 4 and 5 and spaced parallel front and rear walls 6 and 7 (FIGS. 5-7). Tackle box 1 further includes a bottom wall 8 formed integrally with walls 4-7 which is formed with a rectangular-shaped opening 9 in the center thereof.

Figure 8:
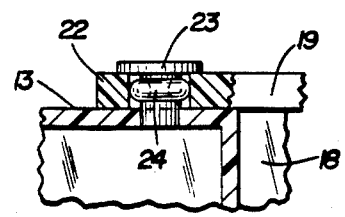
FIG. 8 is an enlarged fragmentary sectional view taken on line 8—8, FIG. 5.

A lid, indicated generally at 11, is pivotally mounted on rear wall 7 by a hinge 12. Lid 11 includes a top wall 13 and sidewalls 14 and 15 and front and rear walls 16 and 17. A rectangular-shaped opening 18 is formed in the center of lid top wall 13 and is vertically aligned with bottom wall opening 9 when the lid is in the closed position and preferably is equal in size and configuration thereto. A handle 19 is pivotally mounted on a post 21 which is formed on lid top wall 13 and has a hooked end 22 which engages a locking post 23. A rubber sleeve 24 is mounted on post 23 (FIG. 8) for securing handle 19 in the full line closed position of FIG. 5. Sleeve 24 enables hooked end 22 to be easily disengaged from post 23 to pivotally move handle 19 to the unlocked position shown in dot-dash lines (FIG. 5) providing complete access to lid opening 18.

Figure 10:
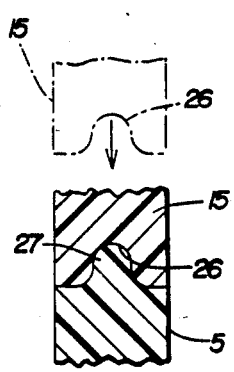
FIG. 10 is an enlarged fragmentary sectional view taken on line 10—10, FIG. 5 with the lid being shown in full sectional lines in closed position and in dot-dash lines in open position.

The peripheral edges of lid walls 14-17 are formed with concave recesses 26 (FIG. 10) which sealingly engage with complementary shaped ribs 27 formed along the top peripheral edges of housing walls 4-7 to form a generally sealed closure when lid 11 is in the closed position with housing 3 as shown in FIGS. 1, 2 and 5-7. Lid 11 preferably is molded as an integral one-piece component of the same lightweight rugged plastic material as is housing 3. Hinge 12 preferably is formed of plastic to provide a rust free construction to the tackle box.

In accordance with one of the features of the invention, a plurality of partition walls, preferably four equal walls as indicated at 30, 31, 32, and 33 are molded integrally with the housing walls and are located in the interior of housing 3. The partition walls are arranged as shown in FIGS. 5-7 and form four equal rectangular shaped compartments indicated at 35, 36, 37, and 38 and a rectangular shaped vertically extending passageway 40. Passageway 40 aligns with bottom wall opening 9 and lid opening 18 when lid 11 is in a closed position. A plurality of ribs may be molded integrally along the peripheral edges of the lid walls and project downwardly therefrom for engagement in recesses formed in the top peripheral edges of the partition walls, similar to recesses 26 and ribs 27 of the housing, to provide a sealing engagement therebetween when the lid is in the closed position.

Figure 23:
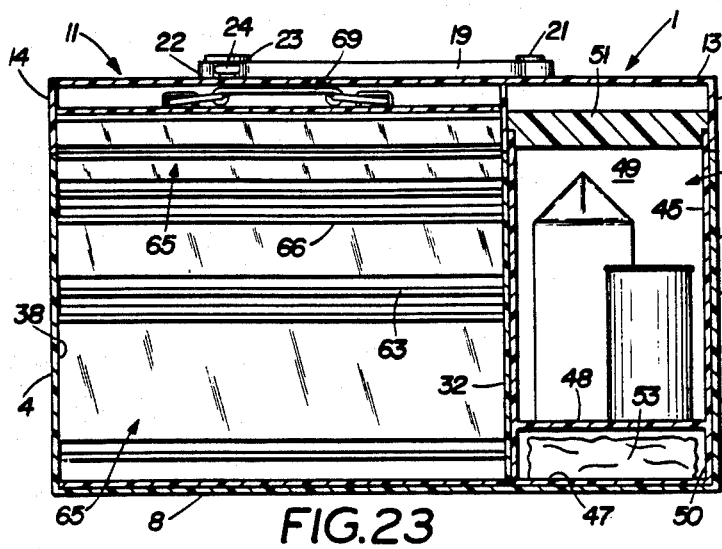
FIG. 23 is an enlarged fragmentary sectional view taken on line 23—23, FIG. 22.
Figure 24:
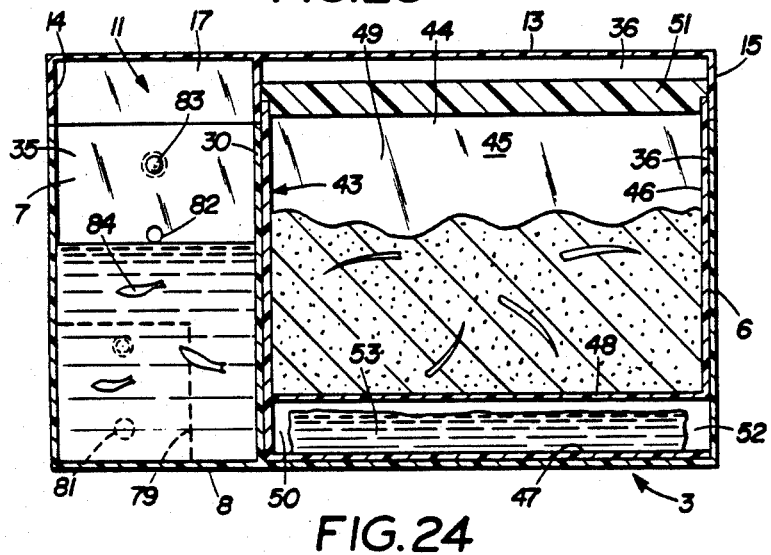
FIG. 24 is an enlarged sectional view taken on line 24—24, FIG. 22.

In further accordance with another of the features of the invention a plurality of storage inserts are provided for placement in storage compartments 35-38. A cold storage insert indicated generally at 43, is shown particularly in FIGS. 11-13 and includes a rectangular-shaped housing 44 formed by spaced parallel sidewalls 45, spaced parallel end walls 46 and a bottom wall 47. A horizontally extending partition wall 48 is formed in the lower portion of the housing dividing it into upper and lower compartments 49 and 50. Upper compartment 49 has an open top selectively closed by an insulated lid 51. An elongated opening 52 is formed in one end wall 46 of cold storage insert 43 providing access into lower compartment 50 for slidably receiving a packet 53 containing a frozen coolant (FIGS. 23 and 24).

Cold storage insert 43 is intended to keep alive worms, maggots, wax worms and other types of bait that thrive in a cool environment or provide adequate cool storage for a days food and drink requirements. Packet 53 contains a usual prefrozen coolant and is inserted into lower compartment 50 beneath the storage bin formed by upper compartment 49. Insulated lid 51 assists in maintaining the contents of upper compartment 49 cool and protects it from the sun and ambient heat during the day. Cold storage insert 43 is slidable into any of the four compartments 35–38 which are formed by partition walls 30–33. As an alternate construction, the frozen coolant could be placed in a lower insulated section of an outside container with a removable inner liner to hold the desired contents to be cooled by the frozen coolant.

A tackle storage insert indicated generally at 57 (FIGS. 14–21), includes a rectangular-shaped housing indicated generally at 58 formed by spaced sidewalls 59 and top and bottom walls 60 and 61, respectively. Housing 58 preferably is molded as a one-piece plastic member and is open at both ends for slidably receiving a plurality of storage trays 65 therein. A plurality of horizontally extending guide rails 63 (FIGS. 15, 16 and 21) are formed along the inside surfaces of sidewalls 59 for slidably supporting and retaining one or more storage trays at 65 thereon.

A plurality of various sized storage trays 65 are shown in FIGS. 17, 18 and 19 and are slidably mounted in storage insert 57 as shown in FIG. 16. The storage trays are similar to each other except for the vertical depths thereof. Each tray has a rectangular shape with guide ribs 66 formed along opposite side walls 67 thereof which are slidably received between adjacent pairs of guide rails 63. Guide rails 63 are equally spaced along the inside surface of sidewalls 59 with storage trays 65 being in multiple depths so that various sizes of the trays may be selectively mounted within housing 58. Trays 65 preferably have an open top and are tailored to fit the need of all sport fisherman regardless of the type fish being sought. Trays 65 will be accessible to the fisherman from either end of housing 58 and may be slid open to at least three fourths of their length from either direction and still be retained within the housing by guide rails 63. Fly fisherman may elect to use several shallow trays with cork liners to separate their flys by color, size, or type. A bass fisherman may elect to use trays of various depths for the storage of their equipment.

A retractable handle indicated generally at 69, is mounted on top wall 60 of housing 58 (FIGS. 14, 15 and 20) by a pair of slide members 70 which extend outwardly from a main strap position 71 for movement about a pair of spaced projections 72 extending upwardly from top surface 60.

Figure 28:
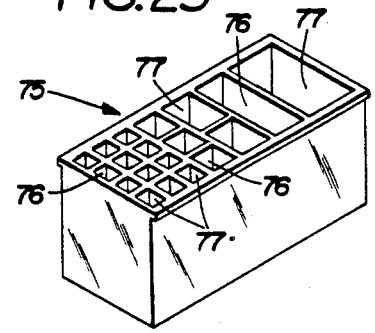
FIG. 28 is a diagrammatic perspective view similar to FIGS. 11 and 14 of the artifical lure storage insert component of the improved tackle box.

An artifical bait storage insert indicated generally at 75, (FIG. 28) is adapted to be slidably mounted within any of the storage compartments 35–38 as are inserts 43 and 57 described above. Storage insert 75 has a rectangular configuration similar in shape and size to the interior of the storage compartments and to inserts 43 and 57. Insert 75 is formed with a plurality of vertically extending partition walls 76 which form a plurality of various size vertical extending individual compartments 77 for receiving and storing artificial baits or lures (not shown) therein.

Artifical bait storage insert 75 and the individual vertical compartments 77 thereof solve many problems existing with prior art horizontal storage units. In these prior art storage units several lures share a single compartment resulting in tangled hooks and wet lures when they are placed on their sides in slowly evaporating puddles of water resulting in rusted hooks and rust stained lure bodies. Also the incompatibility of the paint or plastic results in color bleeding between lures which are in contact with one another in a wet environment, and the soft plastic lures are sometimes placed in contact with hard plastic lures resulting in the destruction of both lures.

Individual vertical compartments 77 of insert 75 prevent the tangling of the lures with each lure being suspended by its rear treble hook from the top of one of the partition walls. Thus, the lure drip dries and cannot come into contact with other lures solving the various problems discussed above. Furthermore, a fisherman can easily remove a lure from its vertical compartment which do not relate to the particular fish which he is contemplating catching on a particular trip. Compartments 77 then enable all types of lures to be stored therein due to the various sizes of the compartments which may vary without affecting the concept of the invention.

One of the housing storage compartments which is indicated at 35, is adapted to accept a small battery operated water pump 79 which is removably mounted therein by various means. Water pump 79 may vary in shape, size and operation without affecting the concept of the invention. A main water inlet hole 81 (FIG. 24) is formed in housing rear wall 7 through which water is drawn by pump 79 and circulated within compartment 35. The water will rise until its depth is controlled by an overflow drain hole 82. Additional drain holes may be formed in housing rear wall 7 and provided with rubber plugs 83 permitting the water depth to be varied as desired by the fisherman. Inlet and drain holes 81 and 82 preferably are formed in rear wall 7 which contains hinge 12 so that lid 11 can be opened from the shore without removing the box from the water. Pump 79 need only be run intermittently to provide fresh oxygen for minnows 84 or other aqueous oriented creatures. Thus compact live bait storage is provided by compartment 35 and water pump 79 eliminating the need to carry a separate container for the storage of minnows or similar live bait. Likewise, pump 79 is easily removed and the holes sealed by plugs 83 enabling compartment 35 to be put to the same use as the other three compartments, namely, the housing of inserts 43, 57 and 75.

Figure 22:
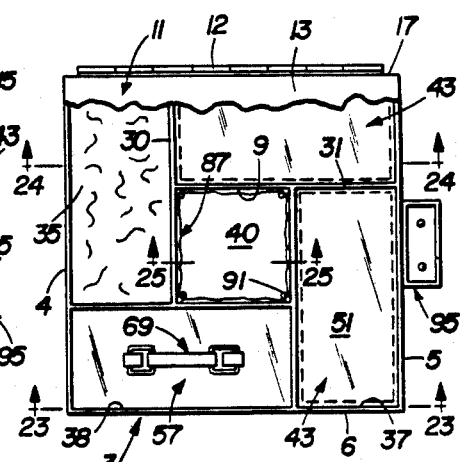
FIG. 22 is a diagrammatic top plan view of the tackle box of FIG. 5 with the lid being broken away and with three of the inserts shown mounted therein and with a holster being mounted on one sidewall of the tackle box.
Figure 25:
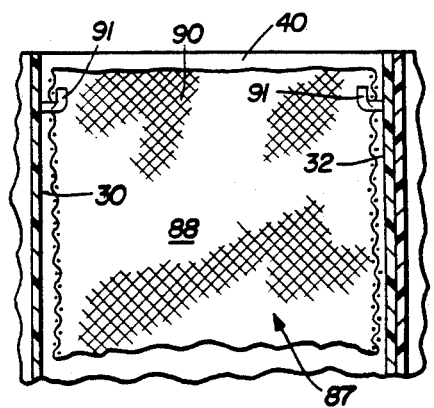
FIG. 25 is an enlarged fragmentary sectional view taken on line 25—25, FIG. 22.

In accordance with another of the features of the invention, a mesh fish container indicated generally at 87 (FIGS. 1–4), is removably mounted on housing 3 and extends beneath the housing when the tackle box is floating in a body of water. Mesh fish container 87 includes a mesh net 88 which is stretched about a frame 86 formed by a plurality of semi rigid rubber tubes 89. Net 88 has an upper portion 90 which extends through rectangular shaped passageway 40 formed in housing 3 by partition walls 30–33 (FIGS. 22 and 25). The top of upper portion 90 is secured to the corners of passageway 40 by a plurality of hooks 91 with the remaining portion of net 88 being suspended beneath housing bottom wall 8 by additional hooks 92. The lower portion of the mesh container, indicated at 93, preferably has a rectangular configuration formed by semi rigid rubber tubes 89 and has the same general dimensions as housing 3.

Figure 1:
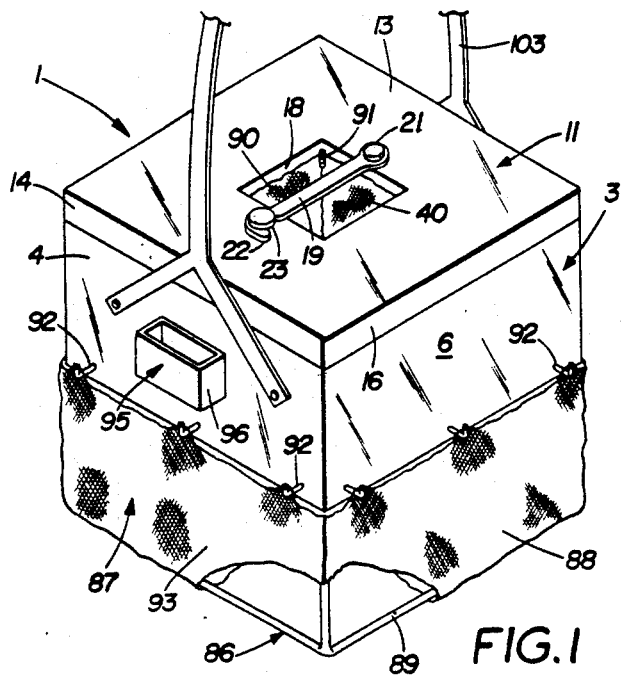
FIG. 1 is a diagrammatic perspective view of the improved tackle box with the fish net shown attached thereto.
Figure 3:
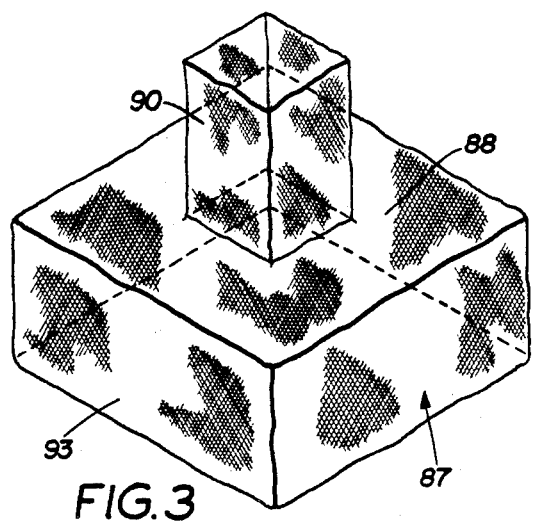
FIG. 3 is a diagrammatic perspective view of the mesh covering for the fish container.
Figure 4:
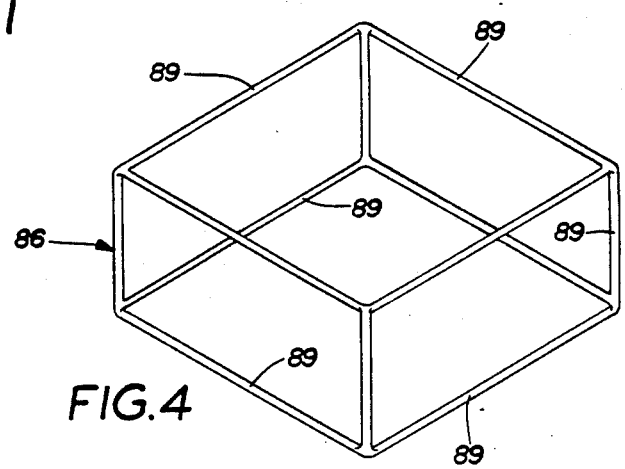
FIG. 4 is a diagrammatic perspective view of the frame portion of the fish container.

Mesh container 87 is compressable due to mesh net 88 and rubber tubes 89 for compact storage in the tackle box when not in use. When container 87 is mounted on housing 3 as shown in FIGS. 1 and 2, it is able to receive and hold a considerable number of fish which are inserted easily through lid opening 18 and passageway 40 and into lower net portion 90 where the fish are trapped and maintained unharmed. Jumping fish are denied escape from mesh container 87 by lid handle 19 when in its closed position across lid opening 18 as shown in FIGS. 1 amd 5.

An inflatable flotation ring is desirable so the mesh fish container can be used separate from the tackle box.

Figure 26:
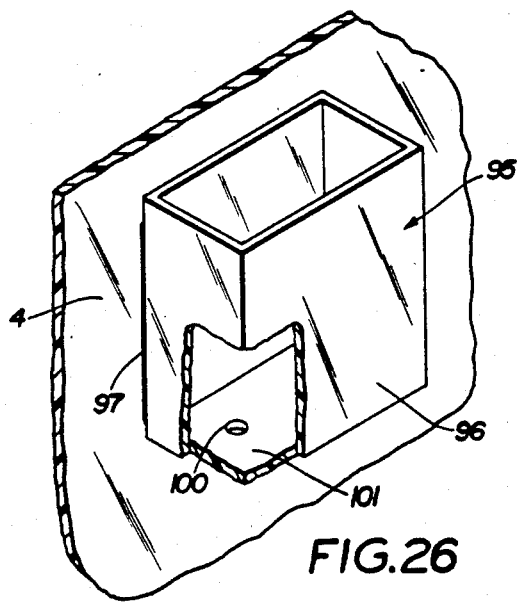
FIG. 26 is an enlarged fragmentary perspective view of a holster shown mounted on the sidewall of the tackle box.
Figure 27:
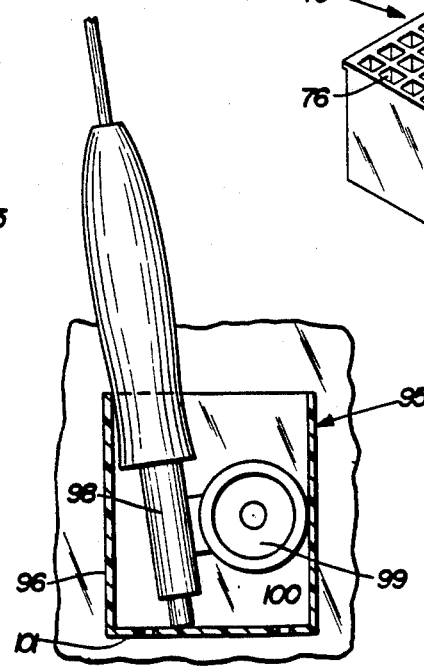
FIG. 27 is a diagrammatic perspective view of the holster of FIG. 26 shown in section with a spinning rod shown mounted therein.

A holster indicated generally at 95 (FIGS. 26 and 27), is attached to the outer surface of housing side walls 4 and/or 5 by an adhesive, mechanical fastener or is molded integrally with the sidewall. Holster 95 is adapted to receive a flyrod butt and reel, the butts of casting or spinning rods, the handles of landing nets or the like. Holster 95 includes a rectangular shaped housing 96 which is secured to one of the housing sidewalls by an adhesive 97 with a flyrod butt 98 and reel 99 being retained therein. Drain holes 100 preferably are formed in bottom wall 101 of holster 95 for preventing the collection of water therein. Holsters 95 permit a fisherman to place such types of equipment therein which will be secured in a non-damaging manner and will be operable while the fisherman wades, floats or fishes from the shore or from a boat with his hands being free for other tasks requiring two handed dexterity.

An adjustable length nonabsorbant tether 103 (FIG. 1) preferably is connected to the housing sidewalls and can be fashioned into a shoulder strap for carrying tackle box 1 or for attaching the box to the shore, boat, pier, dock or float tube as desired by the fisherman preventing the box from floating away from the fisherman.

A preferred size of improved tackle box 1 is housing 3 having a square configuration 20 inches × 20 inches by 10 inches deep with lid 11 being 20 inches × 20 inches and 2 inches high. This provides a closed tackle box having an overall dimension of 20 inches × 20 inches × 12 inches. Bottom wall opening 9 and lid opening 18 and complementary shaped passageway 40 preferably are square measuring 7 inches × 7 inches. Compartments 35–38 would measure approximately 6 inches × 12 inches × 11 inches. This utilizes all of the available space within housing 3. Likewise, storage trays 65 have a depth of 1 inch, 2 inches or 4 inches to provide for a compact multiple arrangement of trays selectable by the fisherman to meet his individual needs. Individual artifical bait storage compartments 77 may also vary in depth from 1 inch to 11 inches, in order to accommodate lures from the size of pin mins to the largest of muskie lures. All types of lures can be stored in compartments 77 including spinnerbaits, spoons, spinners, bucktails, and all crank baits.

Accordingly, improved tackle box 1 has a number of advantages, namely, it is formed of integral plastic molded components which are rust free and can be easily and inexpensively produced. The various storage inserts which are placeable in any of the storage compartments 35–38 enable the tackle box to be tailored to the individual needs and desires of each fisherman and enables nearly all of a fisherman's equipment to be stored in a single box for easy transport by a fisherman. Also the improved tackle box is buoyant permitting it to float adjacent to the fisherman or boat whereby all of the fisherman's equipment is readily available for use. Another advantage is that mesh fish containing 87 provides a convenient container for retaining caught fish in a safe enclosure, which fish container can be easily collapsed and stored in one of the compartments when not in use and which is formed of a mesh unaffected by water as well as the rubber tubes 89 which form frame 86 therefore.

Also, cold storage insert 43 enables bait, food and drink to be maintained in a refrigerated atmosphere by the use of prefrozen coolant packets 53 in lower compartment 50. Likewise, pump 79 enables live bait to be maintained in a fresh state by providing intermittent fresh oxygen for the minnows or other live bait contained therein, and compartments 35–38 can be used for receiving any of the previously described inserts. Also, various size storage trays 65 can be removably mounted in tackle insert 57 for placement in one or more of compartments 35–38. Thus, compact storage is provided and the need for the fisherman to carry a separate container for bait storage is eliminated. Likewise, artificial bait storage insert 75 eliminates all of the problems with prior bait compartments wherein the artificial bait is stored in a horizontal position.

Another advantage is the use of permanently or removably attached holsters 95 located on the sidewalls of the tackle box for temporarily securing a rod or fish net handle therein freeing both hands of the fisherman for performing tasks should the need arise. The particular configuration of the box can also be changed if desired without affecting the concepts of the invention with the compartments taking various configurations than the elongated rectangular configuration shown in the drawings. The box may have rounded corners facilitating molding thereof and preventing sharp points of contact which could possibly injure a fisherman should he accidentally fall or bump against the box especially when used in a boat.

Although the invention as described and shown in the drawings is a tackle box intended for use by fisherman, it need not be limited to such use and could be used for hunters or other sportsman. The various inserts are adaptable for use in carrying other apparatus such as duck calls, ammunition, gloves, cameras, binoculars, or a host of other useful paraphenalia, as well as providing a cool insulated compartment for transporting small captured game from the field.

Accordingly, the improved tackle box is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes only and are intended to be broadly construed.

Moreover, the description and illustration of the invention is by way of example, and the scope of the invention is not limited to the exact details shown or described.

Having now described the features, discoveries, and principles of the invention, the manner in which the improved tackle box is constructed and used, the characteristics of the construction, and the advantageous, new and useful results obtained; the new and useful structures, devices, elements, arrangements, parts, and combinations, are set forth in the appended claims.

What is claimed is:

1. An improved tackle box construction including:
   (a) a buoyant rectangular shaped outer housing having a bottom wall, a pair of spaced parallel sidewalls and spaced parallel front and rear walls, and an open top;

(b) an opening formed in the bottom wall of the housing;

(c) a lid for selectively closing the open top of the housing;

(d) a plurality of partition walls forming a plurality of storage compartments within said housing and forming a vertical passageway extending between the open top of the housing and bottom wall opening, said storage compartments having open tops coinciding with the open top of the housing;

(e) storage inserts removably mounted in certain of the storage compartments only through the open tops of said compartments for storing a variety of items; and (f) a mesh fish storage net mounted on the housing and freely suspended beneath the bottom wall of said housing, said mesh net having a top opening aligned with the bottom wall opening for placing fish into the net through the open top of the housing and through the vertical passageway for maintaining the fish unharmed in the water of a body of water in which the tackle box is floating.

2. The tackle box defined in claim 1 including hinge means pivotally mounting the lid onto the rear wall of the housing for movement between open and closed positions; and in which an opening is formed in the lid and aligns with the bottom wall opening and vertical passageway when the lid is in the closed position.

3. The tackle box defined in claim 2 in which a carrying handle is movably mounted on the lid for movement between open and closed portions, with said handle extending across the lid opening when in closed position.

4. The tackle box defined in claim 2 in which the bottom wall opening, vertical passageway and lid opening are generally rectangular in cross-sectional configuration.

5. The tackle box defined in claim 1 in which the housing walls and partition walls are molded of plastic and form an integral one-piece member.

6. The tackle box defined in claim 1 in which the housing walls terminate in top peripheral edges; in which certain of said edges have sealing ribs formed thereon; in which the lid has a flat rectangular top wall and spaced parallel sidewalls and spaced parallel front and rear walls; and in which the lid walls terminate in peripheral edges with certain of said lid wall edges being formed with sealing grooves which align with and engage said housing wall sealing ribs.

7. The tackle box defined in claim 1 in which the partition walls form four rectangular storage compartments surrounding the bottom wall opening and vertical passageway; in which the partition walls extend vertically throughout the housing and terminate adjacent the open top of the housing; and in which certain of the storage compartments are closed by the lid when in the closed position.

8. The tackle box defined in claim 1 in which one of the storage inserts is a rectangular shaped housing having a lower compartment formed with a side opening, and an upper compartment formed with an open top; in which a lid is removably mounted on said storage insert housing to close the open top thereof; and in which a chilling substance is removably placed in the lower compartment through the side opening for cooling items placed in the upper compartment.

9. The tackle box defined in claim 1 in which one of the storage inserts is an open ended rectangular shaped member formed by spaced parallel sidewalls and spaced parallel top and bottom walls; in which one or more storage trays are slidably mounted on the spaced sidewalls of the member.

10. The tackle box defined in claim 9 in which a series of vertically spaced horizontally extending guide rails extend along inner surfaces of the spaced sidewalls of the open ended member; and in which outwardly extending ribs are formed on the storage trays and are slidably engaged with the guide rails of the open ended member for slidably mounting the trays therein.

11. The tackle box defined in claim 1 in which pump means is mounted within one of the storage components for circulating water contained therein.

12. The tackle box defined in claim 11 in which a plurality of holes are formed in the one of the housing walls and communicate with said one storage compartment; and in which one of said holes is an inlet hole for draining water into said one compartment by the pump means from a body of water in which the tackle box is floating, with another of said holes being an outlet hole and located above the inlet hole for discharging excess water from within said one storage compartment.

13. The tackle box defined in claim 1 in which one of the storage inserts is an artificial bait storage insert having a rectangular shaped housing complementary to certain of the storage comparments; and in which a plurality of partition walls is located within the insert housing and form a plurality of vertically extending bait receiving compartments.

14. The tackle box defined in claim 1 in which holster means is mounted on an outer surface of one of the housing walls for holding a fishing rod.

15. The tackle box defined in claim 1 in which the partition walls form four elongated rectangular storage compartments similar to each other in shape and size; in which said storage compartments surround the vertical passageway which also has a rectangular configuration; and in which the storage inserts are complementary in outer configuration to the interior of the storage compartments and are slidably received within any of said storage compartments.

16. An improved tackle box construction including:
(a) a rectangular shaped buoyant housing having at least sidewalls and a bottom wall;
(b) a plurality of partition walls within the housing forming four similar components surrounding and forming a passageway rectangular in cross sectional extending through said housing;
(c) an opening formed in the bottom wall of the housing aligned with the passageway;
(d) storage inserts removably mounted in certain of the compartments; and
(e) a fish net mounted on the housing and located beneath the bottom wall for retaining fish therein; said fish net having a frame formed of resilient members and a mesh covering attached to said frame, said covering having an inlet passage communicating with and extending into the bottom wall opening and passageway and terminating therein for placing fish within the net through said passageway.

17. The improved tackle box defined in claim 16 in which the storage inserts are rectangular in internal configuration complementary to the compartments and are removably slidably mounted therein.

* * * * *